United States Patent [19]
Witek et al.

[11] Patent Number: 5,885,023
[45] Date of Patent: Mar. 23, 1999

[54] WINDSHIELD WIPER BLADE CONNECTOR

[75] Inventors: James Patrick Witek, Michigan City; Richard Allen Herring, Granger; Alan Jeffrey Stahlhut, Valparaiso; William Arthur Powell, Winamec, all of Ind.

[73] Assignee: Cooper Automotive Products, Inc., Houston, Tex.

[21] Appl. No.: 746,270

[22] Filed: Nov. 8, 1996

[51] Int. Cl.⁶ ...................................................... B60S 1/40
[52] U.S. Cl. ......................... 403/321; 403/4; 15/250.32
[58] Field of Search .................... 403/321, 3, 4; 15/250.32, 250.351, 250.31

[56] References Cited

U.S. PATENT DOCUMENTS

| | | | |
|---|---|---|---|
| 3,408,680 | 11/1968 | Heller | 15/250.42 |
| 3,641,614 | 2/1972 | Newsome | 15/250.32 |
| 3,942,212 | 3/1976 | Steger et al. | 15/250.42 |
| 4,023,232 | 5/1977 | Smithers | 15/250.32 |
| 4,127,912 | 12/1978 | Deibel et al. | 15/250.42 |
| 4,179,766 | 12/1979 | Weiler et al. | 15/250.32 |
| 4,290,164 | 9/1981 | van den Berg | 15/250.32 |
| 4,296,521 | 10/1981 | Mower | 15/250.32 |
| 4,343,062 | 8/1982 | van den Berg | 15/250.32 |
| 4,443,907 | 4/1984 | Chamberlain | 15/250.32 |
| 4,578,839 | 4/1986 | Nishikawa | 15/250.32 |
| 4,878,263 | 11/1989 | Raymond | 15/250.32 |
| 5,070,573 | 12/1991 | Journee et al. | 15/250.32 |
| 5,084,933 | 2/1992 | Buechele | 15/250.32 |
| 5,136,748 | 8/1992 | Naruke et al. | 15/250.32 |
| 5,168,597 | 12/1992 | Schon et al. | 15/250.32 |
| 5,289,608 | 3/1994 | Kim | 15/250.32 |
| 5,332,328 | 7/1994 | Yang | 15/250.32 |
| 5,392,487 | 2/1995 | Yang | 15/250.32 |
| 5,435,041 | 7/1995 | Ho | 15/250.32 |
| 5,606,765 | 3/1997 | Ding | 15/250.32 |
| 5,611,103 | 3/1997 | Lee | 15/250.32 |
| 5,618,124 | 4/1997 | Chen | 15/250.32 X |
| 5,632,059 | 5/1997 | Lee | 15/250.32 |

FOREIGN PATENT DOCUMENTS

| | | | |
|---|---|---|---|
| 329515 | 8/1989 | European Pat. Off. | 15/250.32 |
| 2377302 | 9/1978 | France | 15/250.32 |
| 3222891 | 12/1983 | Germany | 15/250.32 |
| 611563 | 6/1979 | Switzerland | 15/250.32 |

OTHER PUBLICATIONS

"Wiper Blade—Fits Most Import & Domestic Cars and Light Trucks," Saver, Stk No. 10–182 (xerox copy of product), purchased Jul., 1997, Drawings of connector included.

Cooper Industries, Anco Division, "Anco Instructions–Installation—20–11, 33–18," No. 85374 (1995).

Cooper Industries, Anco Division, "Instructions—Removal—Installation—N–16R–N–21R" (1994).

Cooper Industries, Anco Division, "Anco Instructions—Installation—25–16—24–24, 31–17, 31–19, 90–16–90–22A," No. 85360A (1994).

Cooper Industries, Anco Division, "Instructions—T Series—Removal—Installation," No. 86001 (1995).

Cooper Industries, Anco Division, "Instructions—U15R–U24R—Removal—Installation," No. G85370B (1995).

(List continued on next page.)

*Primary Examiner*—Anthony Knight
*Attorney, Agent, or Firm*—Fish & Richardson PC

[57] ABSTRACT

A windshield wiper blade connector may be used in connecting a windshield wiper blade to pin-type and hookslot wiper arms. The connector includes a side wall that defines a hole sized to receive a pin of a pin-type wiper arm. A movable beam is positioned relative to the hole in the side wall so that the beam engages the pin of the pin-type wiper arm when the pin is received in the hole to secure the connector to the pin-type wiper arm. A tab extends from the movable beam and is positioned so that the tab engages a slot of a hookslot wiper arm when the hookslot wiper arm is attached to the connector to secure the connector to the hookslot wiper arm.

28 Claims, 9 Drawing Sheets

OTHER PUBLICATIONS

Cooper Industries, Anco Division, "Rainy Day Instructions—Removal—Installation—Anco Advantage & TRICO, Tridon, Bosch II," No. 85363 (1994).

Cooper Industries, Anco Division, "Pantograph Arms—¼–28 Screw Shaft Arm—½ Inch and ⅝ Inch Serrated Drum Shaft Arm—Universal Adjustable Wiper Arms," No. 94121 (Mar. 1992).

Cooper Industries, Anco Division, "Anco Instructions—Installation—22–18, 25–12–25–15, 31–12," No. 85357A (1995).

Cooper Industries, Anco Division, "Anco Instructions—Installation—29–16–29–24, 30–15–30–18," No. 85359 (1994).

Cooper Industries, Anco Division, "Instructions—N Series—Removal—Installation," No. 86000 (1994).

Cooper Industries, Anco Division, "Instructions—11–13–11–22—Removal—Installation," No. 85365A (1994).

Cooper Industries, Anco Division, "Installation—Audi, Saturn, Bosch, N–22R" (1994).

Cooper Industries, Anco Division, "Rainy Day Instructions—Installation—RDB16–RDB19," No. 85393 (1994).

NAPA Windshield Products, instructions for removal and installation of wiper blades, No. 56734–6 (1993) (U.S. Patent 4,127,912).

Removal and installation instructions for wiper blades, No. V–5912–27 (Nov. 1992).

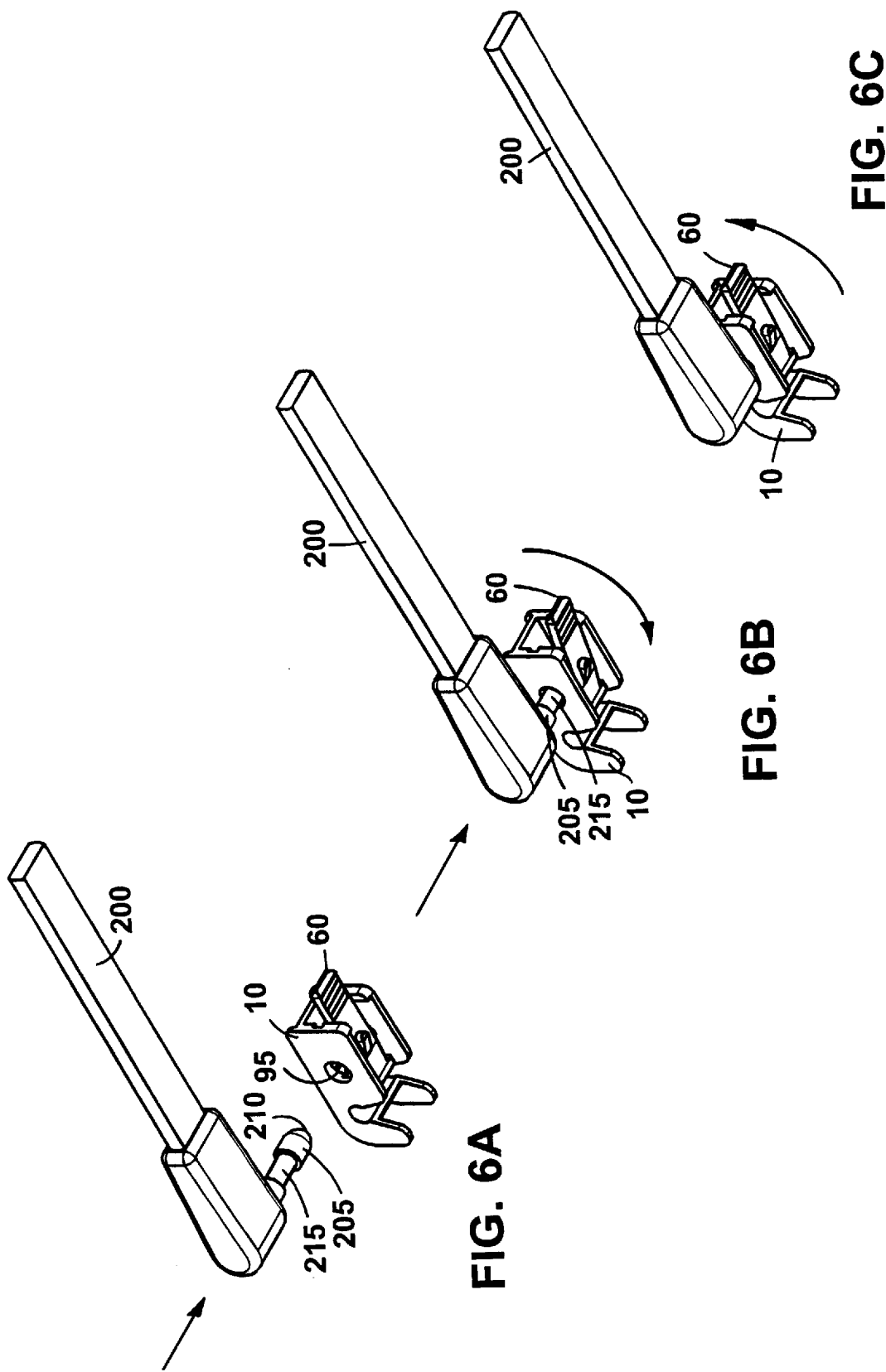

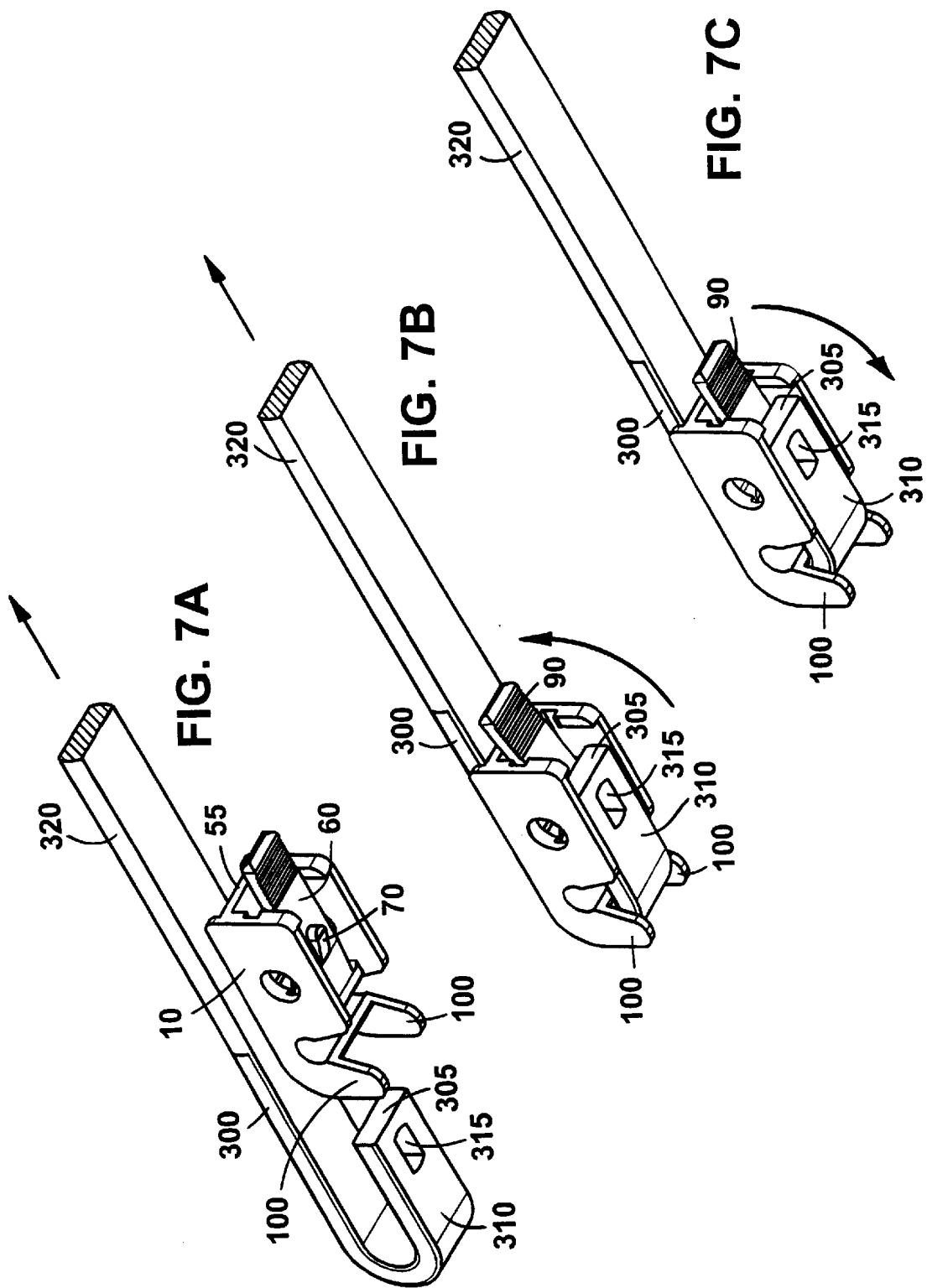

WINDSHIELD WIPER BLADE CONNECTOR

BACKGROUND OF THE INVENTION

The invention relates to a windshield wiper blade connector.

In general, the primary types of wiper arms for automotive windshield wipers are pin-type arms and hookslot arms. A wiper blade assembly may be connected to a pin-type arm by inserting a pin of the pin-type arm through a hole in a connector of the wiper blade assembly. A wiper blade assembly may be connected to a hookslot arm by sliding a hook of the hookslot arm over a connector of the wiper blade assembly until a tab of the connector locks within a slot of the hookslot arm. Manufacturers of windshield wiper blades typically produce a standard blade assembly and provide an assortment of connectors for use in adapting the standard blade assembly to different wiper arm configurations.

SUMMARY OF THE INVENTION

In one aspect, generally, the invention features a multi-purpose windshield wiper blade connector for use in connecting a windshield wiper blade to pin-type and hookslot wiper arms. The connector includes a side wall defining a hole sized to receive a pin of a pin-type wiper arm and a movable beam, such as a cantilevered beam, positioned relative to the hole in the side wall so that the beam secures the connector to the pin-type wiper arm by engaging the pin of the pin-type wiper arm when the pin is received in the hole. A tab extends from the movable beam and is positioned so that the tab secures the connector to the hookslot wiper arm by engaging a slot of a hookslot wiper arm when the hookslot wiper arm is attached to the connector.

Embodiments of the invention may include one or more of the following features. The connector may include a second side wall that defines a second hole sized to receive the pin of the pin-type wiper arm, and an upper wall that extends between the first and second side walls. The side walls may extend above the upper wall to define a channel along the top of the connector. The channel may secure a portion of a hookslot wiper arm when the connector is attached to the hookslot wiper arm.

The tab may be located on a first side of the movable beam and the movable beam may be positioned so that a second side of the movable beam engages the pin of the pin-type wiper arm when the connector is attached to the pin-type wiper arm. The tab may include a ramped end positioned to encounter an end of the hookslot wiper arm as the connector is attached to the hookslot wiper arm.

The movable beam and the tab may be configured so that the beam may be depressed to bend the beam and retract the tab from the slot of the hookslot wiper arm to release the connector from the hookslot wiper arm. The beam may be bent similarly to release the connector from a pin-type wiper arm. The connector also may include a textured button for use in bending the movable beam.

The movable beam may be positioned relative to the hole in a side wall so that the beam partially blocks a path extending from the hole to the corresponding hole in the opposite side wall. The width of the movable beam may be such that the beam fits within a groove in the pin of the pin-type wiper arm.

The connector may include a snap-fit latch for use in attaching the connector to a windshield wiper blade assembly. In addition to the connector, the assembly may include a windshield wiper blade carrier attached to the connector and a windshield wiper blade attached to the carrier.

The invention provides a simple and efficient connector for attaching windshield wiper blades to different types of wiper arms. This promises to dramatically simplify the process of replacing wiper blades, and also will serve to eliminate or reduce waste associated with providing multiple connectors with each blade.

Other features and advantages of the invention will be apparent from the following detailed description, including the drawings, and from the claims.

BRIEF DESCRIPTION OF THE DRAWING

FIGS. 6A–6C are perspective views illustrating attachment of the connector of FIG. 1 to a pin-type wiper arm.

FIGS. 7A–7C are perspective views illustrating attachment of the connector of FIG. 1 to a hookslot wiper arm.

DESCRIPTION OF THE PREFERRED EMBODIMENTS

Figure 1:
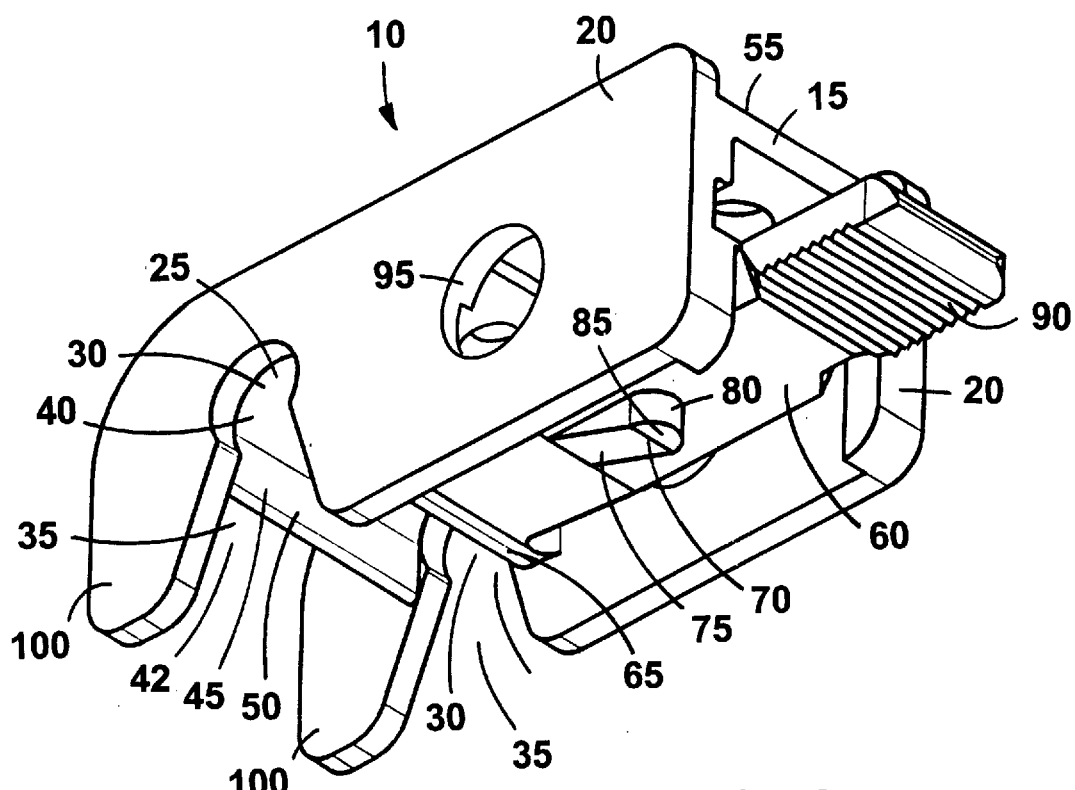
FIG. 1 is a perspective view of a multi-purpose windshield wiper blade connector.
Figure 2:
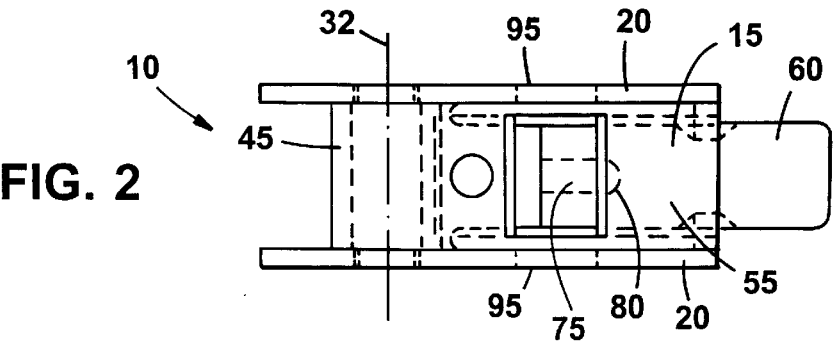
FIGS. 2–5 are top, side, bottom and end views of the connector of FIG. 1.
Figure 5:
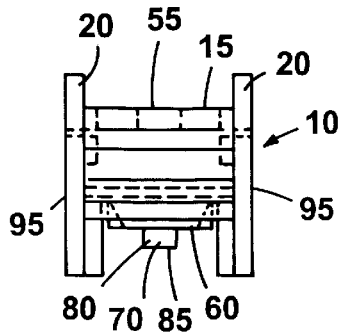
Figure 3:
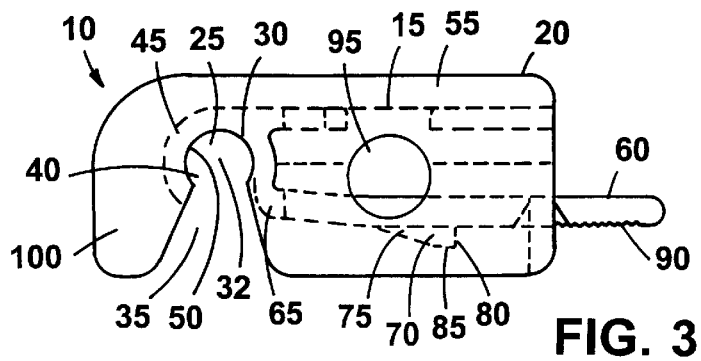
Figure 4:
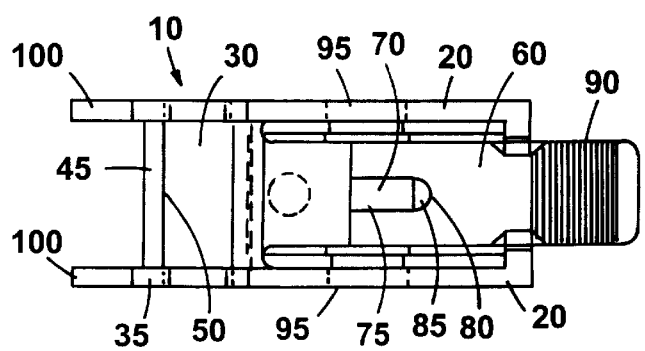

As shown in FIGS. 1–5, a multi-purpose windshield wiper blade connector 10 is configured for attachment to both pin-type and hookslot wiper arms. The connector includes an upper wall 15 and a symmetric pair of side walls 20. At one end of the connector, the upper wall 15 and the side walls 20 define a snap-fit latch 25 for use in attaching the connector 10 to a windshield wiper blade assembly (not shown). The latch is defined by an arcuate channel 30 that includes holes in the side walls, extends between the side walls, and has an axis 32 perpendicular to the side walls. In each side wall 20, a flared opening 35 extends from a narrow region 40 where it joins the arcuate channel 30 to an expanded region 42 at the edge of the side wall. The holes in the side walls, including the narrow region 40, define an arc of greater than 180°. Between the side walls, the channel 30 is relieved relative to the holes in the side walls. This provides for a less stiff connection with the windshield wiper blade assembly. If a more stiff connection were desired, the entire length of the channel 30 could match the shape of the openings in the side walls. In use, the connector 10 is attached to a wiper blade assembly by sliding the flared openings 35 over a rod (not shown) of the wiper blade assembly so that the openings 35 guide the rod toward the arcuate channel 30. The narrow region 40 of the arcuate channel is sized so that the rod slightly deforms the connector to expand the narrow region 40 as the rod passes through the narrow region. Once the rod passes through the narrow region 40, the connector snaps back so that the narrow region 40 secures the rod within the arcuate channel 30.

The upper wall 15 curves down at the end of the connector at which the latch 25 is located. The curved end 45 of the upper wall 15 defines a first portion 50 of the arcuate channel 30. The side walls 20 extend slightly above the upper wall 15 to define a channel 55 along the top of the connector 10. As discussed below, the channel 55 secures a portion of a hookslot wiper arm when a windshield wiper blade assembly including the connector 10 is secured to a hookslot wiper arm.

A cantilevered beam 60 extends from a second portion 65 of the arcuate channel 30. The beam 60, which is not directly attached to the side walls 20, is positioned near the bottom of the connector 10 and is aligned with the upper wall 15. The beam 60 is used to secure the connector 10 to both hookslot and pin-type wiper arms. To this end, the beam 60 includes a tab 70 that is used to secure the connector to a hookslot wiper arm. The tab 70 includes a ramped face 75 at an end of the tab closer to the latch 25, a stepped end 80 at the other end of the tab, and a flat portion 85 between the two ends. The beam 60 also includes a textured button 90 that may be depressed to bend the beam 60 and retract the tab 70 to release the connector 10 from the hookslot wiper arm.

For attachment to a pin-type wiper arm, each side wall 20 of the connector includes a circular hole 95 that permits insertion of the pin into the connector. The holes 95 are positioned relative to the beam 60 so that the beam partially blocks a path between the holes 95 near the bottoms of the holes. The width (W) of the beam 60 is such that the beam fits within a groove in the pin.

As shown in FIGS. 6A–6C, the connector 10 (or a windshield wiper blade assembly including the connector 10) may be attached to a pin-type wiper arm 200. The wiper arm 200 includes a pin 205 having a rounded end 210 and a groove 215. To attach the connector to the arm 200, the pin 205 is aligned with the holes 95 and inserted into a hole 95 (FIG. 6A). As the pin 205 is inserted into the hole 95, the rounded end 210 of the pin encounters the beam 60 and pushes down on the beam 60 (FIG. 6B). The downward force exerted by the pin 205 bends the beam 60 and permits further insertion of the pin into the hole 85. When the pin 205 is inserted far enough that the pin extends through the other hole 95, the beam 60 aligns with the groove 215. This removes the force that was previously asserted by the pin against the beam 60 and permits the beam 60 to snap into place within the groove 215 (FIG. 6C). Interference between sides of the beam 60 and sides of the groove 215 secures the connector 10 against lateral motion along the pin 205 while permitting pivotal motion about the pin 205.

The connector 10 may be removed from the arm 200 in a two-step process. A user first pulls down on the beam 60 to release the beam from the groove 215. The user then slides the connector 10 off of the pin 205.

As shown in FIGS. 7A–7C, the connector 10 also may be attached to a hookslot wiper arm 300. An end 305 of the wiper arm 300 is bent to define a hook 310. A slot 315 is located in the hook 310 near the end 305. To attach the connector to the arm 300, the connector is positioned with the channel 55 next to a main portion 320 of the arm 300 and the end of the connector having the latch 25 facing the hook 310 (FIG. 7A). The connector is then moved along the arm 300 so that the curved end 45 of the upper wall passes between the hook 310 and the main portion 320 of the arm 300, and the end 305 of the arm 300 passes between extensions 100 of the connector.

When the end 305 of the arm 300 encounters the tab 70, the hook slides along the ramped end 75 in a horizontal direction. This generates an upward force that pushes up on the beam 60 and bends the beam (FIG. 7B). The hook continues to exert the upward force on the beam until the stepped end 80 of the tab is aligned with the slot 315. At that point, the beam 60 snaps back into place and forces the tab 70 into the slot 315 (FIG. 7C). When the tab is in the slot, the stepped end 80 of the tab abuts against an inner wall of the slot to hold the connector 10 in place on the hookslot arm 300.

The connector 10 may be removed from the arm 300 in a two-step process. A user first depresses the button 90 to push up on the beam 60 to release the tab 70 from the slot 315. The user then slides the connector 10 from between the hook 310 and the main portion 320.

Figure 8A:
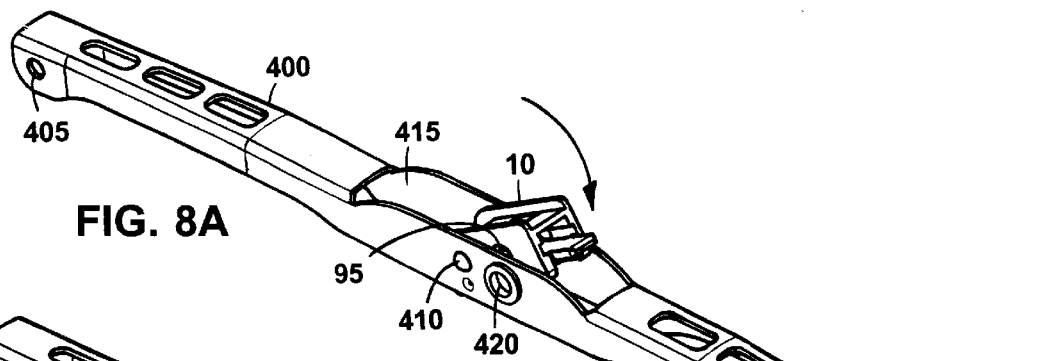
FIGS. 8A–8C are perspective views illustrating attachment of a wiper blade assembly including the connector of FIG. 1 to a pin-type wiper arm.
Figure 8B:
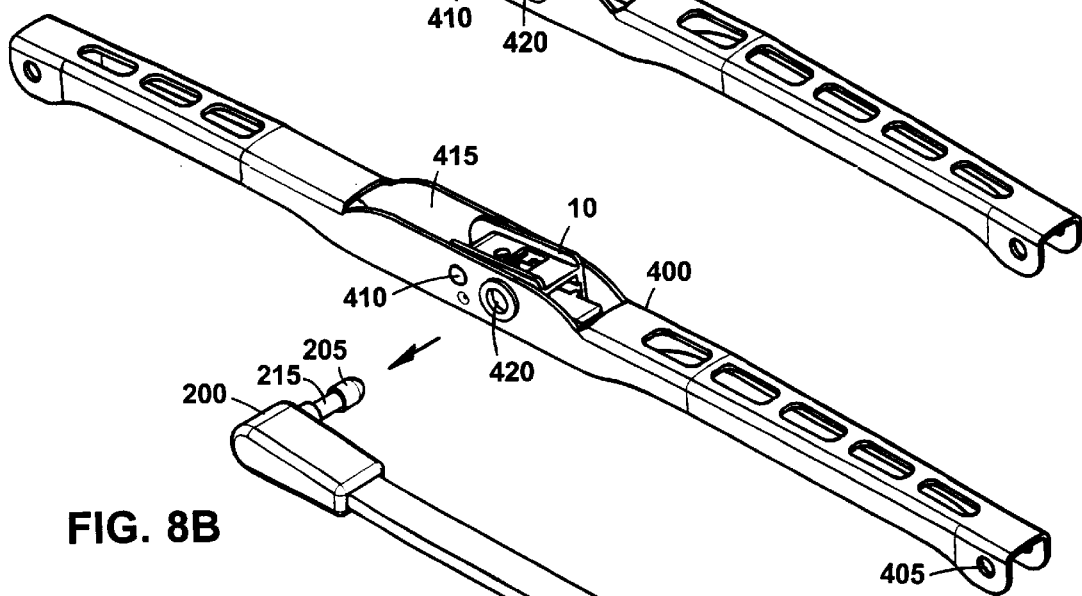
Figure 8C:
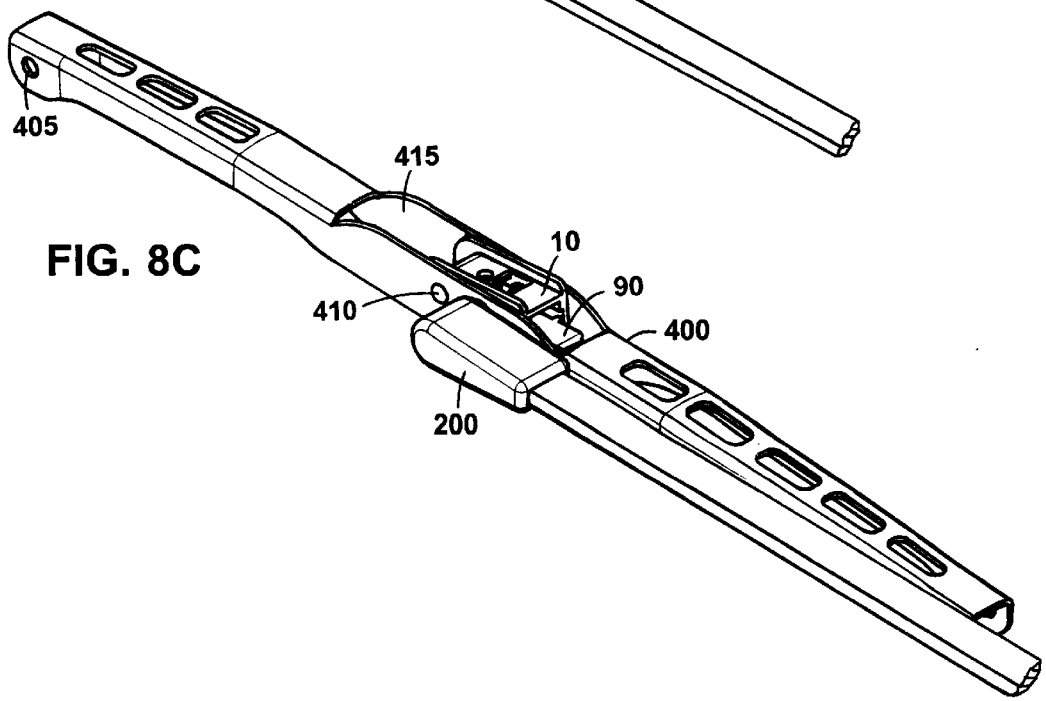

As illustrated in FIGS. 8A–8C, a wiper blade carrier 400 includes a connector 10 and attachment holes 405 to which a windshield wiper blade may be attached. The carrier 400 may be installed on a pin-type arm 200 using a simple procedure. First, the connector 10 is rotated about a rod 410 within a bridge opening 415 of the carrier 400 until the holes 95 in the sides of the connector are aligned with bridge side holes 420 in the sides of the carrier 400 (FIG. 8A). Next, a bridge side hole is pushed onto the pin 205 of the wiper arm (FIG. 8B) until the beam 60 snaps into place in the groove 215 of the pin 205 (FIG. 8C).

Referring to FIG. 8C, the upper surface of the button 90 is exposed by the bridge opening 415 when the carrier 400 is attached to the wiper arm 200. Accordingly, the carrier 400 may be removed from the arm 200 by pushing down on the upper surface of the button 90 and sliding the carrier 400 off of the pin 205.

Figure 9A:
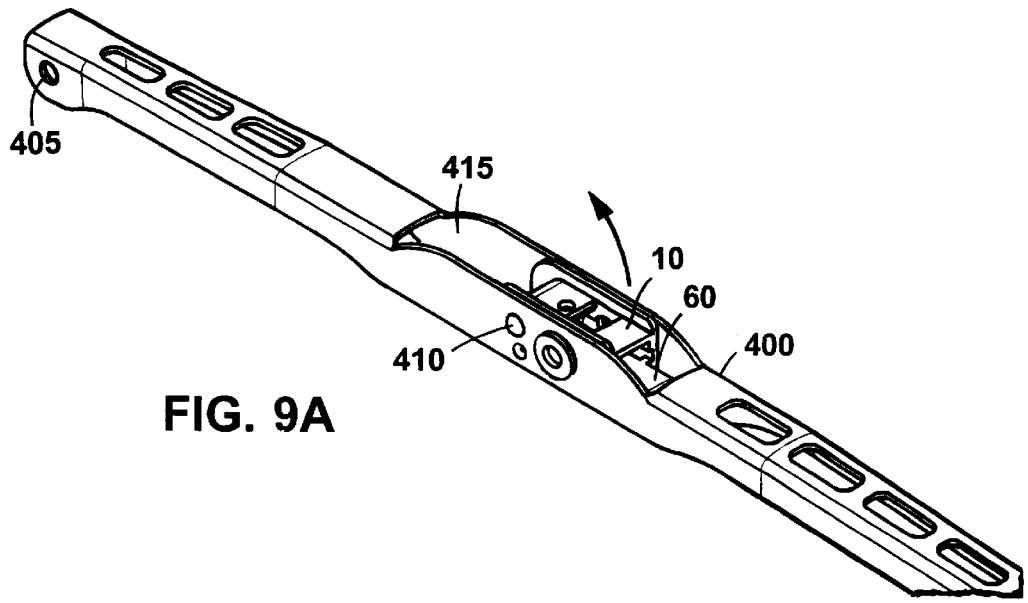
FIGS. 9A–9D are perspective views illustrating attachment of a wiper blade assembly including the connector of FIG. 1 to a hookslot wiper arm.
Figure 9B:
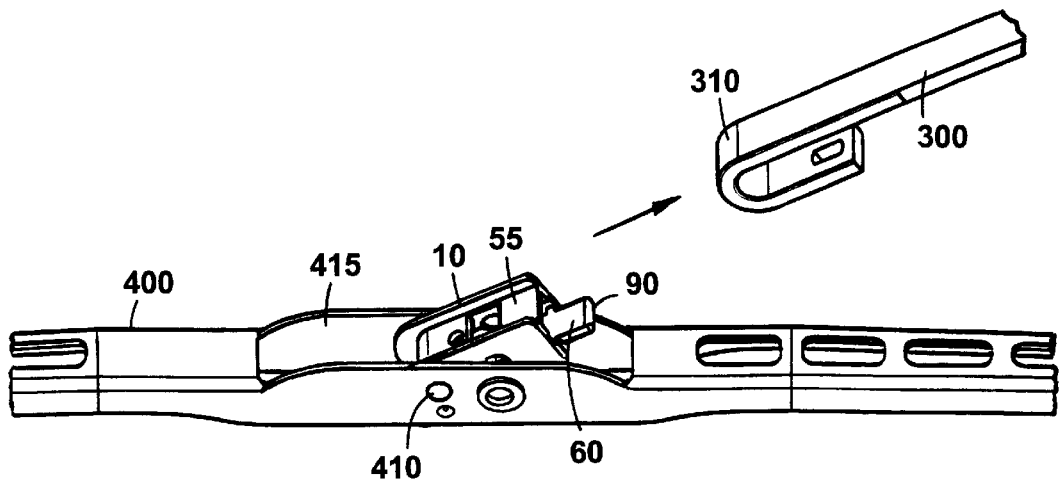
Figure 9C:
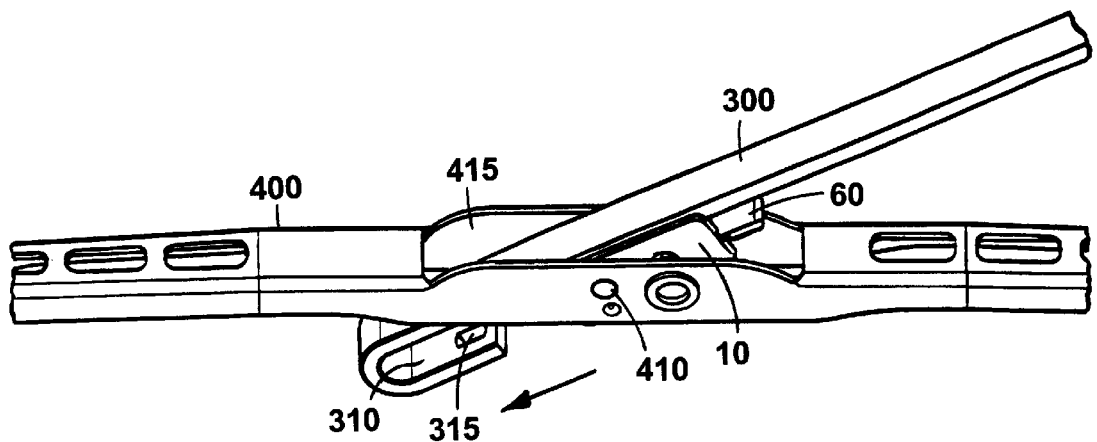
Figure 9D:
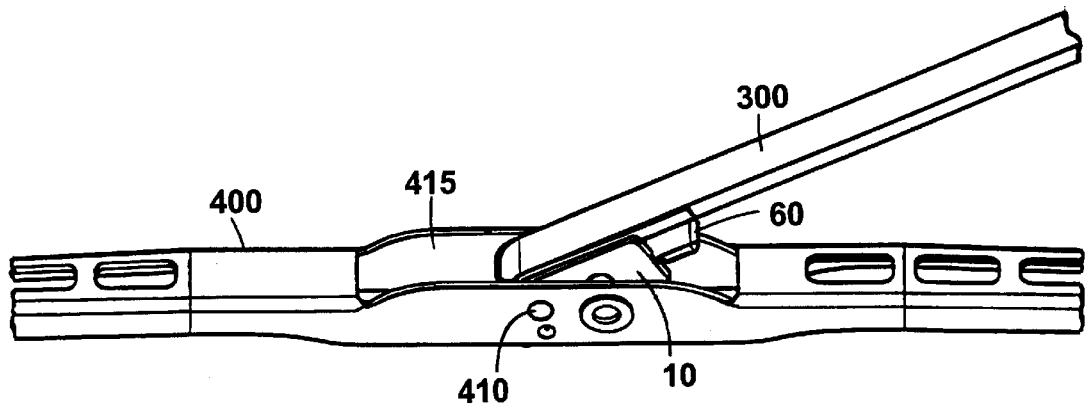
Figure 10A:
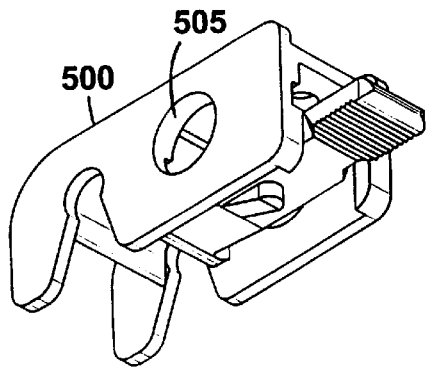
FIGS. 10A–10E are perspective, top, side, bottom and end views of anther multi-purpose windshield wiper blade connector.
Figure 10B:
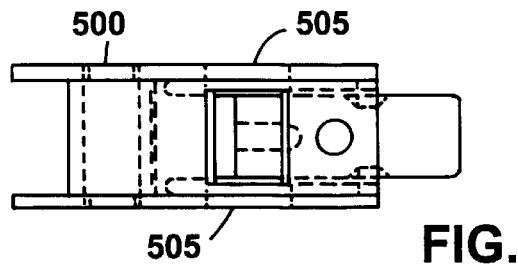
Figure 10E:
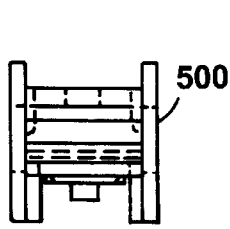
Figure 10C:
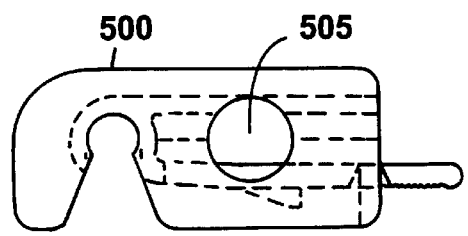
Figure 10D:
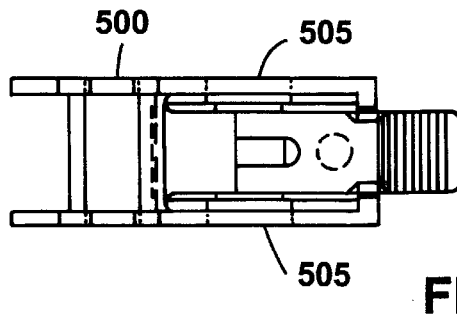
Figure 11E:
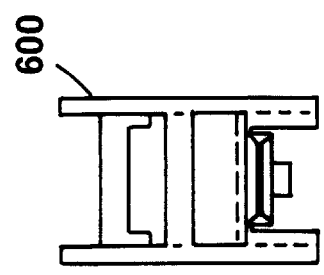
FIGS. 11A–11E are side, top, bottom, front and rear views of another multi-purpose windshield wiper blade connector.
Figure 11B:
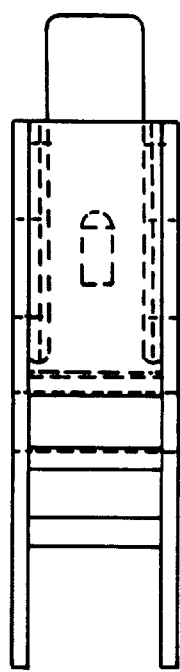
Figure 11A:
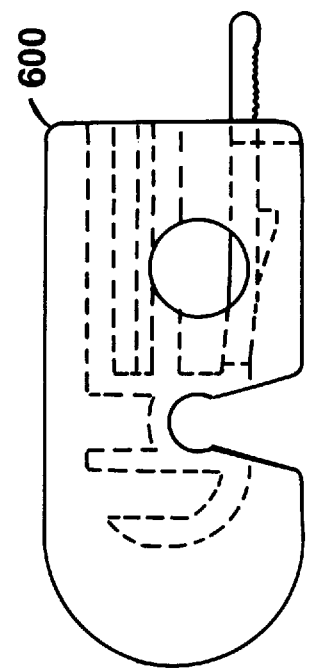
Figure 11C:
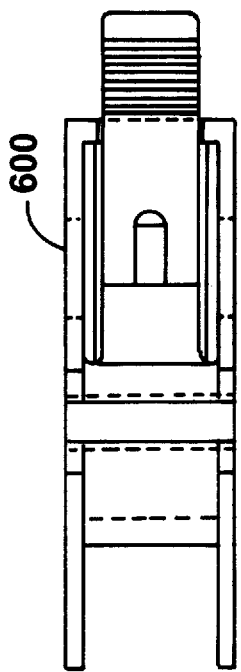
Figure 11D:
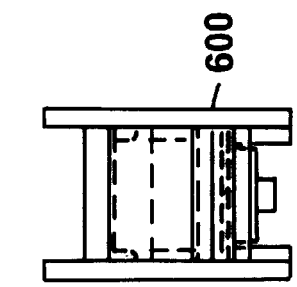

As illustrated in FIGS. 9A–9D, the wiper blade carrier 400 also may be installed on a hookslot wiper arm 300 using a simple procedure. First, the connector 10 is rotated about the rod 410 (FIG. 9A) until the beam 60 extends from the bridge opening 415 to provide clearance (FIG. 9B). Next, the carrier 400 is moved past the hook end 310 of the hookslot wiper arm 300 (FIG. 9B) until the hook 310 extends through the bridge opening 415 and the wiper arm rests in the channel 55 at the top of the connector (FIG. 9C). Finally, the carrier 400 is moved back toward the hook 310 (FIG. 9C) until the connector 10 snaps onto the wiper arm 300 (FIG. 9D). The carrier 400 may be removed from the arm 300 by pressing up on the button 90 to release the tab 70 from the slot 315. With the button pressed, the steps of the installation procedure are reversed to remove the carrier 400 from the arm 300.

Other embodiments are within the scope of the following claims. For example, FIGS. 10A–10E illustrate another connector 500. The connector 500 differs from the connector 10 only in that holes 505 of the connector 500 are larger than the corresponding holes 95 of the connector 10. The connector 500 is sized for use with pin-type arms having ¼ inch diameter pins. By contrast, the connector 10 is sized for use with pin-type arms having 3/16 inch diameter pins. Both connectors also are sized for use with 9 mm wide hookslot arms having thicknesses of 2.5 mm, 2.8 mm, 3.0 mm, 3.2 mm or 3.5 mm.

FIGS. 11A–11E illustrate a connector 600 that is sized for use with pin-type arms having ¼ inch diameter pins and 9 mm wide hookslot arms having thicknesses of 4 mm. The connector 600 is taller than the connectors 10, 500, which permits attachment of the connector 600 to a hookslot arm having a thicker hook. The connector 600 operates identically to the connectors 10, 500.

What is claimed is:

1. A windshield wiper blade connector for use in connecting a windshield wiper blade to pin-type and hookslot wiper arms, the connector comprising:

structure for use in attaching the connector to a windshield wiper blade;

a side wall defining a hole sized to receive a pin of a pin-type wiper arm;

a movable beam positioned relative to the hole in the side wall so that the beam engages the pin of the pin-type wiper arm when the pin is received in the hole to secure the connector to the pin-type wiper arm;

a tab extending from the movable beam and positioned so that the tab engages a slot of a hookslot wiper arm when the hookslot wiper arm is attached to the connector to secure the connector to the hookslot wiper arm;

wherein the tab is located on a first side of the movable beam and the movable beam is positioned so that a second side of the movable beam engages the pin of the pin-type wiper arm when the connector is attached to the pin-type wiper arm and the structure for use in attaching the connector to a windshield wiper blade assembly includes a snap-fit latch.

2. The connector of claim 1, further comprising a second side wall defining a second hole sized to receive the pin of the pin-type wiper arm.

3. The connector of claim 2, further comprising an upper wall extending between the first and second side walls.

4. The connector of claim 3, wherein the side walls extend above the upper wall to define a channel along the top of the connector, the channel securing a portion of a hookslot wiper arm when the connector is attached to the hookslot wiper arm.

5. The connector of claim 1, wherein the movable beam is isolated from direct connection to the side wall.

6. The connector of claim 1, wherein the tab includes a ramped end positioned to encounter an end of the hookslot arm as the connector is attached to the hookslot arm.

7. A The connector of claim 1, wherein the movable beam and the tab are configured so that the beam may be depressed to bend the beam and retract the tab from the slot of the hookslot wiper arm to release the connector from the hookslot wiper arm.

8. The connector of claim 7, further comprising a button for use in bending the movable beam.

9. The connector of claim 8, wherein the button comprises a textured button.

10. The connector of claim 1, wherein the movable beam is positioned relative to the hole so that the beam partially blocks a path extending from the hole.

11. The connector of claim 1, wherein a width of the movable beam is sized so that the beam fits within a groove in the pin of the pin-type wiper arm.

12. The connector of claim 1, wherein the movable beam comprises a cantilevered beam.

13. A windshield wiper blade assembly including the connector of claim 1, the assembly further comprising:

a windshield wiper blade carrier attached to the connector; and a windshield wiper blade attached to the windshield wiper blade carrier.

14. The connector of claim 1, wherein the hole sized to receive the pin of the pin-type wiper arm is enclosed such that the side wall completely surrounds the hole.

15. The connector of claim 1, wherein the structure for attaching the connector to the windshield wiper blade is independent of the hole sized to receive the pin of the pin-type wiper arm.

16. The connector of claim 1, wherein the hole sized to receive the pin of the pin-type wiper arm permits attachment to the pin when the connector is attached to the windshield wiper blade.

17. A multi-purpose windshield wiper blade connector for use in connecting a windshield wiper blade to pin-type and hookslot wiper arms, the connector comprising:

structure for use in attaching the connector to a windshield wiper blade;

a pair of side walls, each side wall defining a hole sized to receive a pin of a pin-type wiper arm;

an upper wall positioned between the two side walls;

a cantilevered beam positioned relative to the holes in the side walls so that the beam engages the pin of the pin-type wiper arm when the pin is received in the holes to secure the connector to the pin-type wiper arm; and a tab extending from the cantilevered beam and positioned so that the tab engages a slot of a hookslot wiper arm when the hookslot wiper arm is attached to the connector to secure the connector to the hookslot wiper arm;

wherein the side walls extend above the upper wall to define a channel along the top of the connector, the channel securing a portion of a hookslot wiper arm when the connector is attached to the hookslot wiper arm, the tab is located on a first side of the cantilevered beam and the cantilevered beam is positioned so that a second side of the cantilevered beam engages the pin of the pin-type wiper arm when the connector is attached to the pin-type wiper arms, and the structure for use in attaching the connector to a windshield wiper blade comprises a snap-fit latch for use in attaching the connector to a windshield wiper blade.

18. The connector of claim 17, wherein the tab includes a ramped end positioned to encounter an end of the hookslot arm as the connector is attached to the hookslot arm.

19. The connector of claim 17, wherein the cantilevered beam and the tab are configured so that the beam may be depressed to bend the beam and retract the tab from the slot of the hookslot wiper arm to release the connector from the hookslot wiper arm.

20. The connector of claim 17, wherein the cantilevered beam is positioned relative to the holes so that the beam partially blocks a path extending between the holes.

21. The connector of claim 17, wherein a width of the cantilevered beam is sized so that the beam fits within a groove in the pin of the pin-type wiper arm.

22. A windshield wiper blade assembly including the connector of claim 17, the assembly further comprising:

a windshield wiper blade carrier attached to the connector; and a windshield wiper blade attached to the windshield wiper blade carrier.

23. The connector of claim 17, wherein the side walls completely surround the holes sized to receive the pin of the pin-type wiper arm.

24. The connector of claim 17, wherein the structure for attaching the connector to the windshield wiper blade is independent of the holes for receiving the pin of the pin-type wiper arm.

25. The connector of claim 17, wherein the holes sized to receive the pin of the pin-type wiper arm permit attachment to the pin when the connector is attached to the windshield wiper blade.

26. A windshield wiper blade connector comprising:

a pin support having a support axis and a mechanism to secure the connector to a pin of a pin-type wiper arm with a longitudinal axis of the pin in line with the support axis and the pin restrained against axial motion, structure for use in attaching the connector to a windshield wiper blade, and a hook support having a mechanism to secure a hook of a hookslot wiper arm against longitudinal motion with the pin support axis being perpendicular to the length of the hookslot wiper arm and in a space defined within the hooks, wherein the structure for use in attaching the connector to a windshield wiper blade comprises a snap-fit latch for use in attaching the connector to a windshield wiper blade.

27. The connector of claim 26, wherein the structure for attaching the connector to the windshield wiper blade is independent of the mechanism to secure the connector to a pin of a pin-type wiper arm.

28. A windshield wiper blade connector comprising:

a mechanism configured to secure the connector to a either a pin-type wiper arm or a hookslot wiper arm, a tab that is movable between one position in which the connector may be mounted on a pin-type wiper arm and a second position in which the connector may be mounted on a hookslot wiper arm, and a snap-fit latch for use in attaching the connector to a windshield wiper blade.

* * * * *